Patented Mar. 28, 1950

2,502,258

UNITED STATES PATENT OFFICE 2,502,258

ISOLATION OF AN ISOMERIC FORM OF BENZENE HEXACHLORIDE

Jean Kerr Hay and Kenneth Clive Webster, Liverpool, England, assignors to Imperial Chemical Industries Limited, a corporation of Great Britain No Drawing. Application May 18, 1945, Serial No. 594,590. In Great Britain May 18, 1944

4 Claims. (Cl. 260—648)

This invention relates to improvements in the production of organic compounds, and more particularly to the isolation of gamma-benzene hexachloride or mixtures containing that isomer.

It is known that benzene hexachloride can be obtained by reacting chlorine with benzene under conditions promoting the addition of chlorine, but not the substitution of chlorine for hydrogen; thus chlorine may be passed into benzene at ordinary or elevated temperatures, for example 50° C. to 60° C., while irradiating the benzene with actinic radiation. After removing any unchanged benzene from the chlorination product, a mixture of stereoisomeric benzene hexachlorides results in which the alpha-isomer, M. P. 158° C., predominates, but the beta-isomer, M. P. 305° C., and the gamma-isomer, M. P. 113° C., are also present. Small amounts of chlorine-substituted benzene hexachloride, for example the monochloro- body, may also be formed during the chlorination, and will be present in the mixture of isomers. Such a mixture of isomers in which the alpha-isomer predominates is conveniently referred to as crude benzene hexachloride. The chlorination at ordinary or elevated temperature may be discontinued while all of the isomers are still in solution in unchanged benzene, or it may be continued until solid alpha-isomer separates; in either event the crude benzene hexachloride is conveniently recovered by contacting the chlorination product with hot water, for example water at 75° C. to 80° C., to flash off the unchanged benzene.

Hitherto the gamma-isomer has been obtained by continuing the chlorination of the benzene until a slurry of alpha-benzene hexachloride is formed; the solid alpha-isomer is then filtered off, and the mother liquor is submitted to fractional crystallisation to recover beta- and gamma-isomers. This mother liquor, of course, is saturated with the alpha-isomer and, in addition to the beta- and gamma-isomers, will contain minor amounts of chlorine-substituted benzene hexachlorides formed during the chlorination. During the subsequent fractional crystallisation some of the alpha-isomer crystallises with the gamma-isomer, making the isolation of the latter difficult, and the method troublesome to carry out. The chlorine-substituted benzene hexachlorides, which appear to be more soluble in benzene than the gamma-isomer, may also interfere with the clean separation of crystalline gamma-isomer.

According to the present invention a process for treating crude benzene hexachloride so as to obtain the gamma-isomer, or a composition containing an enhanced proportion of gamma-isomer to alpha-isomer, comprises extracting the crude benzene hexachloride with a solvent therefor comprising at least one normally liquid homologue of benzene in amount sufficient to dissolve gamma-isomer and leave a substantial proportion of the alpha-isomer undissolved. Advantageously the solvent is composed of one or more homologues of benzene containing in the molecule not more than 9 carbon atoms.

The alpha-isomer has a smaller solubility in the benzene homologues than the gamma-isomer, and thus the solids present in the extract obtained by such a process have an enhanced proportion of gamma-isomer to alpha-isomer compared with the original material. Small amounts of the beta-isomer and more highly chlorinated bodies present in the chlorination product will also be present in the extract. The presence of the beta-isomer is not objectionable, and for many purposes the presence of the more highly chlorinated material is not objectionable either. However, the presence of such material does tend to interfere with the ready crystallisation of the gamma-isomer; it also appears to be associated with the odour which crude benzene hexachloride possesses. If, therefore, it is desired to isolate crystalline gamma-benzene hexachloride or to diminish the odour of the gamma-containing extract, it may be advantageous to treat the crude benzene hexachloride before extraction to remove at least part of such materials, as will be hereinafter described.

While any normally liquid homologue of benzene may be used to carry out the extraction, it is advantageous to select one which does not possess an unduly high boiling point, since subsequent recovery of the benzene hexachloride is then easier. For this reason we prefer to select a homologue which does not contain more than 9 carbon atoms. Such homologues include toluene, ortho-, meta-, and para-xylene, commercial xylene, mesitylene, cumene, and pseudocumene. We prefer to use toluene or commercial xylene, since these are readily available and are the lowest boiling of the homologues. By commercial xylene we mean the mixture of xylene isomers obtained by distillation of coal tar and normally sold as "xylene."

In carrying out the process of the present invention it is advantageous so to carry out the extraction that substantially all of the gamma-isomer is dissolved and at most a small proportion of the alpha-isomer. In the case of either toluene or the xylenes an amount of the solvent may be used for the extraction corresponding to as much as half the weight of the crude benzene hexachloride without dissolving any substantial amount of alpha-benzene hexachloride. However, rather more solvent than corresponds to this preferred amount may be used if the presence of some alpha-isomer in the product is not objectionable. It may also be desirable to use a rather greater quantity of solvent with rather less solvent power. A liquid may be used for this purpose consisting of a mixture of the benzene homologue with a liquid miscible therewith but having at most a low solvent power for gamma-benzene hexachloride; suitable liquids for this purpose are mixtures of toluene or a xylene with between 10% and 20% of a normally liquid low-boiling aliphatic hydrocarbon such as a pentane or the various petrol ether fractions.

The extraction may conveniently be carried out in the cold, that is to say at temperatures not greatly different from atmospheric. The subsequent recovery of the product from the extract may be carried out by fractional crystallisation, for example by heating the solution at ordinary or reduced pressure to evaporate part of the solvent, and allowing the concentrated solution to cool to room temperature. Alternatively, if pure gamma-isomer is not required, a product containing all of the latter in the extract may be recovered by evaporating off the volatile solvent in one operation.

The production of the additive chlorination product may be carried out in known manner. For example, chlorine may be passed into benzene at ordinary or elevated temperature while irradiating the benzene with the radiation from a mercury arc lamp, sunlight, or other actinic radiation. The introduction of chlorine may be continued until a slurry of benzene hexachloride results, but preferably it is discontinued while all the product is still in solution, since at that stage a smaller proportion of substitution products will be present. Conveniently, chlorination is continued until a solution containing 15% to 20% by weight of benzene hexachloride is obtained.

The benzene can then be removed from the solution or slurry by contact with hot water at 75° C. to 80° C. Alternatively, the benzene may be evaporated off in an externally heated vessel maintained, if desired, under reduced pressure. However, the removal of benzene by means of hot water is a particularly suitable method, since efficient removal of the benzene results without submitting the benzene hexachloride to conditions under which partial decomposition to trichlorobenzene could occur, and since the product is obtained in convenient form for handling.

Before extraction according to the present invention, the crude benzene hexachloride obtained in this way may be subjected to a deodorising treatment as referred to above, by boiling with concentrated nitric acid as described in copending British application No. 3,434/45 or by contacting it with silica gel or absorbent carbon as described in copending British applications Nos. 18,571/44, 3,437/45, and 3,438/45. A further method which is effective in removing at least a substantial proportion of the highly chlorinated material is to wash the crude benzene hexachloride in the cold with a normally liquid volatile aliphatic hydrocarbon, using an amount insufficient to dissolve substantial amounts of gamma-benzene hexachloride. Suitable hydrocarbons for this purpose are the pentanes, and the various hydrocarbon fractions obtained in the petroleum industry and known as petrol ethers. Amounts of these hydrocarbons to employ are amounts approximately equal in weight to the crude benzene hexachloride, but somewhat larger quantities, say twice the weight of the crude benzene hexachloride, may be employed.

In one form of the present invention benzene is chlorinated while irradiating it with sunlight, or the light from a mercury arc lamp, by passing in chlorine at such a rate that it is substantially completely absorbed. Suitably the temperature is maintained between 40° C. and 50° C. When the solution formed contains 15% to 20% benzene hexachloride, chlorination is stopped and the solution is added gradually to a large agitated volume of water maintained at 75° C. to 80° C.; it can then be separated from the water by filtration or decantation, dried at 30° C. to 35° C., and ground. To carry out the extraction it is then agitated for a time, say 1 to 2 hours, with approximately 0.5 times its weight of toluene; the resultant solution is then filtered off. Suitably the benzene hexachloride is added in portions to the solvent while the latter is stirred.

The extract can then be heated so as to evaporate substantially all of the toluene, whereby a residue is obtained which is essentially a mixture of isomeric benzene hexachlorides containing an enhanced proportion of gamma-isomer to alpha-isomer. Instead of evaporating off all of the toluene the extract may be concentrated by heating to evaporate off part of the solvent and then cooled so that crystallisation takes place. Thus, if initially between one third and one half of the toluene is evaporated off, a fraction can be obtained which is substantially all gamma-isomer. Several solid fractions in succession may be obtained in this way. Other methods of recovering the gamma-containing solid may also be employed. Thus the extract may be caused to deposit benzene hexachloride crystals by cooling it to subnormal temperatures without prior concentration, or by adding sufficient of a liquid miscible therewith which has at most a low solubility for benzene hexachloride isomers, for example a pentane or a petrol ether.

The gamma-benzene hexachloride, the solid containing an enhanced proportion of gamma-isomer, or the extract containing the latter, may be used in the manufacture of pest control compositions as described and claimed in one form of the invention of copending British application No. 10,459/42. Solutions suitable as insecticidal sprays may also be obtained by diluting the extract with a miscible solvent for the benzene hexachloride, such as kerosene, which does not cause precipitation of the dissolved solid.

The alpha-benzene hexachloride may, if desired, be used for other purposes, such as the manufacture of trichlorobenzene.

The following examples illustrate but do not limit the invention, all parts being by weight.

*Example 1*

Chlorine was passed into benzene at the rate of 22 parts per hour for each 100 parts of benzene, while maintaining the benzene at 50° C. and irradiating it with the radiation from a mercury arc lamp. Absorption of chlorine was substantially complete. After 1 hour chlorination was stopped. The resultant solution of benzene hexachloride was gradually added to a large volume of water maintained at 76° C. to 78° C. and agitated with a stirrer. The precipitated product was filtered off, dried in a tray drier for 24 hours, and ground.

1000 parts of the ground benzene hexachloride so obtained were agitated in the cold for 2 hours with 450 parts of commercial xylene, the resultant solution was filtered off, and the remaining undissolved material was washed with 100 parts of the xylene and the latter was added to the solution. By evaporating off the xylene from the resultant solution approximately 300 parts of solid were obtained containing substantially all of the gamma-isomer in the 1000 parts of ground benzene hexachloride.

Example 2

1000 parts of ground benzene hexachloride obtained as in Example 1 were agitated in the cold with 425 parts of toluene for 2 hours; the resultant solution was filtered off and the residue on the filter washed with 100 parts of toluene, the washings being added to the solution. By evaporating off the toluene from the extract approximately 300 parts of solid were obtained containing substantially all of the gamma-isomer in the ground material.

Example 3

5 parts of xylene extract containing 2 parts of solid and obtained as in Example 1, were diluted with 50 parts of a light kerosene boiling in the range 198° C. to 257° C. The liquid was used successfully as a spray to combat houseflies.

Example 4

A larvicidal oil for treating stagnant water was made by mixing 5 parts of xylene extract containing 2 parts of solid and obtained as in Example 1 with 50 parts of white oil. ("White oil" is a kerosene having an initial boiling point of 300° C., 78% of it distilling below 367° C.)

Example 5

100 parts of crude benzene hexachloride were stirred at room temperature with 44 parts of toluene for 1 hour. The resulting slurry was filtered, whereby 63 parts of filtrate were obtained. After heating the filtrate to evaporate 19 parts of toluene it was allowed to cool to room temperature, when 2.5 parts of substantially pure gamma-isomer were deposited and were then isolated by filtration.

Further quantities of solid containing the gamma-isomer could be obtained by adding 20 parts of petrol ether, B. P. 60° C. to 80° C., to the mother liquor.

We claim:
1. A process for treating crude benzene hexachloride, which is the total mixture of normally solid isomers of benzene hexachloride obtained by the additive chlorination of benzene, so as to produce a benzene hexachloride composition having an enhanced proportion of gamma-isomer to the alpha-isomer, which includes the steps of extracting the crude benzene hexachloride in the cold with at least one normally liquid solvent homologue of benzene selected from the group consisting of toluene, ortho-, meta-, and para-xylene, mesitylene, cumene, and pseudo-cumene, the amount of the solvent being sufficient to dissolve substantially all of the gamma-isomer, and insufficient to dissolve more than half the total crude solvent, this amount being more than half the weight of the total crude solid, separating the solution from the undissolved solid, and rejecting the latter.

2. A process as set forth in claim 1 wherein the solvent is composed of a mixture of the said benzene homologue component with between 10% and 20% of a normally liquid low boiling aliphatic hydrocarbon.

3. A process as set forth in claim 1, including the additional steps of recovering solid from the resulting extract by adding thereto a liquid which is miscible with the solvent but which has, at most, a low solubility for the benzene hexachloride in such amount as to cause the solid to separate from the extract, and isolating the solid.

4. A process for the production of gamma-benzene hexachloride which comprises extracting in the cold with approximately half its weight of xylene deodorized crude benzene hexachloride, which is the total mixture of normally solid isomers of benzene hexachloride produced by the additive chlorination of benzene, thereby forming a solution containing gamma-benzene hexachloride and undissolved solid comprising alpha-benzene hexachloride, separating the said solution from the said solid, evaporating from the said solution between a third and a half of the xylene therein, allowing the concentrated solution to deposit solids at ordinary temperature, and isolating the solid so deposited.

JEAN KERR HAY.
KENNETH CLIVE WEBSTER.

REFERENCES CITED

The following references are of record in the file of this patent:

UNITED STATES PATENTS

| Number | Name | Date |
|---|---|---|
| Re. 14,562 | Wells | Dec. 10, 1918 |
| 2,010,841 | Bender | Aug. 13, 1935 |
| 2,218,148 | Hardie | Oct. 15, 1941 |

OTHER REFERENCES

Van der Linden, Berichte der Deut. Chem. Gesell., vol. 45 (1912), pages 231–247.

Heys, "Zeitschrift fur Chemie," New Series, vol. 7, page 293 (1871).

Leeds, "Jour. Am. Chem. Soc.," vol. 2, pages 205–6 (1880).

Matthews, "Jour. Chem. Soc.," vol. 59, (London), transactions, pages 165–6 (1891).